United States Patent Office 3,311,580
Patented Mar. 28, 1967

3,311,580
COATING COMPOSITIONS COMPRISING DIAL-
LYLIDENE ACETAL-FATTY ACID PARTIAL
ESTER-POLYOL REACTION PRODUCTS
Norman C. MacArthur, Avondale, Pa., assignor to Hercules Incorporated, a corporation of Delaware
No Drawing. Filed Apr. 3, 1964, Ser. No. 357,292
8 Claims. (Cl. 260—23.5)

This invention relates to the preparation of novel resin compositions which cure by the mechanism of air oxidation. More particularly, this invention relates to novel air-oxidizable resin compositions comprising polyetheracetals derived from spirobi(meta-dioxane) derivatives chemically modified with drying oil fatty acid partial esters of polyols.

It is known that diallylidene pentaerythritol, also known as 3,9-divinylspirobi(meta-dioxane), and having the formula:

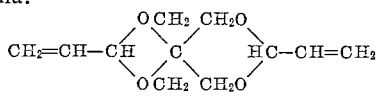

can be prepared by reacting pentaerythritol and acrolein, and that it can be condensed by heating in the presence of strong acid catalysts with various polyols to form substantially infusible solids. Other related spirobi(meta-dioxane) compounds react similarly.

Although such cross-linked resins, containing as they do, both ether linkages and acetal linkages, have many properties which make them commercially attractive in the plastics and coatings arts, they possess the disadvantage of releasing acrolein or similar lachrymator when heated to effect cure, and even though the amount of such lachrymator is quite small, it is sufficient to annoy and irritate persons who use the compositions. Moreover, all such resins heretofore have required strong acid catalysts at relatively high temperatures for satisfactory curing into insoluble and infusible films, and the combination of the strong acid catalyst and high temperature of cure is detrimental and damaging to many substrates, as for example, corrodible metal surfaces such as steel, or cellulosic textile fibers sensitive to acid hydrolysis.

It is an object of this invention, therefore, to provide novel polyetheracetal resins which are curable to cross-linked three-dimensional structures by the mechanism of air oxidation, rather than by acid-catalyzed condensation via free reactive hydroxyl groups in the resin.

It is a further object of this invention to provide a process for preparing polyetheracetal resins which can be cured to cross-linked three-dimensional structures by the mechanism of air oxidation in the presence of a metal drier.

These objects and others are accomplished in accordance with this invention, which, generally described, comprises reacting a diallylidene acetal with alcoholic hydroxyl-containing reactants having a stoichiometric equivalence with respect to hydroxyl groups substantially about 2, at least one of said reactants being a drying oil fatty acid partial ester of polyhydroxy alcohol having at least one free hydroxyl group per molecule of said partial ester, in the presence of an acid catalyst in an inert atmosphere at elevated temperatures, and terminating the reaction short of the gel point by removing the acid catalyst.

The novel compositions of this invention, therefore, are solvent-soluble polyetheracetal resins having unsaturated fatty acid ester substituent groups in the chemical structure of each resin molecule, and comprise the reaction product of a diallylidene acetal with alcoholic hydroxyl-containing reactants having a stoichiometric equivalence with respect to hydroxyl groups substantially about 2, at least one of said reactants being a drying oil fatty acid partial ester of polyhydroxy alcohol having at least one free hydroxyl group per molecule of said partial ester.

These polyetheracetal resins, having unsaturated fatty acid ester substituent groups in the chemical structure of each resin molecule, upon incorporation of a suitable metal drier thereinto, are readily cured to cross-linked structures which are hard, tough, mar-, solvent- and abrasion-resistant by the mechanism of air oxidation, at room temperature or in relatively shorter times at elevated temperatures. Dissolved in solvent, these resins in the presence of metal driers form coating compositions which are the basis for protective coatings on a wide variety of substrates, and there is substantially no tendency for the coating compositions to corrode or otherwise damage the substrate, or evolve lachrymator, during the curing thereof, either at room temperature or at elevated temperatures.

Polyetheracetal resins prepared in accordance with this invention are readily applied from a wide range of solvents and exhibit good storage stability, and may be cured by the mechanism of air oxidation over a wide range of temperatures and times depending on the type and concentration of metal drier employed and drying oil acids employed in preparing the resins.

The diallylidene acetals suitable for practice of this invention are well known materials which can be represented by the following formula:

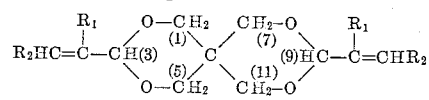

in which $R_1$ represents hydrogen, alkyl having from 1 to 6 carbon atoms, phenyl, or halogen, and $R_2$ represents hydrogen or methyl. They are readily prepared by known methods by the simple expedient of reacting two mols of an α-β unsaturated aldehyde of not more than 10 carbon atoms of the general formula:

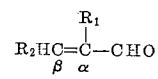

in which $R_1$ and $R_2$ have the same meaning as set forth above, with one mol of a polyhydroxy alcohol capable of forming at least two cyclic acetal groups per mol of polyhydroxy alcohol, in the presence of an acid catalyst such as p-toluenesulfonic acid, with removal of water of condensation during the reaction. It is customary in preparing the diallylidene acetals of this invention to employ an excess over stoichiometric requirement of the unsaturated aldehyde, and to strip off excess aldehyde at the end of the condensation reaction.

Some typical unsaturated aldehydes of the above formula include, by way of example, acrolein, α-methylacrolein, α-hexylacrolein, α-isobutylacrolein, α-chloroacrolein, α-bromoacrolein, α-phenylacrolein, crotonaldehyde, α-chlorocrotonaldehyde, α-bromocrotonaldehyde, α-butylcrotonaldehyde, α-methylcrotonaldehyde, α-phenylcrotonaldehyde, and the like. Unsaturated aldehydes having terminal methylene groups are preferred.

Typical polyhydroxy alcohols capable of forming at least two cyclic acetals per mole thereof include, for example, pentaerythritol, dipentaerythritol, tripentaerythritol, sorbitol, and others having at least 4 hydroxyl groups per molecule.

Thus, for example, the reaction of pentaerythritol with acrolein produces 3,9-divinylspirobi(meta-dioxane); the reaction of pentaerythritol with α-chloroacrolein produces 3,9-di(1-chlorovinyl)spirobi(meta-dioxane); the reaction of pentaerythritol with α-methylacrolein produces 3,9-diisopropenylspirobi(meta-dioxane); etc.

An essential reactant for preparing the polyetheracetal resins of this invention having unsaturated drying oil fatty acid substituent groups in the chemical structure of each resin molecule is a drying oil fatty acid partial ester of polyhydroxy alcohol having at least one free hydroxyl group per molecule of said partial ester. The preparation of these partial esters may be carried out using any polyhydroxy alcohol having three or more hydroxyls per molecule and combining the same with any of the typical drying moieties by conventional esterification methods, such as, for example, (1) by direct esterification of the alcohol with drying oil acids, or (2) by alcoholysis of drying oils, or (3) by alcoholysis of lower alkyl esters of drying oil acids.

Suitable polyhydroxy alcohols that can be used, singly or in admixture, for preparing the drying oil fatty acid partial esters of this invention include trimethylolethane, trimethylolpropane, glycerol, pentaerythritol, dipentaerythritol, tripentaerythritol, sorbitol, and any other having three or more hydroxyl groups per molecule. Any of the well-known drying oils, or the corresponding acids or esters of these acids may be used. Typical of these are linseed oil, soybean oil, dehydrated castor oil, oiticica oil, safflower oil, tung oil, fish oil, and the like; linoleic acid, linolenic acid, eleostearic acid, clupanodonic acid, unsaturated tall oil fatty acids, and the like; and lower alkyl esters as, for example, the methyl or ethyl esters of such unsaturated fatty acids.

In the preparation of these partial esters, it is essential that not all of the hydroxyls of the polyhydroxy alcohol be reacted, since free hydroxyl groups in the partial ester are necessary for the preparation of the polyetheracetal resin. The minimum hydroxyl functionality of these partial esters, therefore, is one free hydroxyl group per ester molecule. In general, however, from 1 to 4 free hydroxyl groups per ester molecule are useful for the purposes of this invention. The exact extent of esterification will depend on the intended unsaturated fatty acid ester substituent content of the final polyetheracetal resin and on the over-all hydroxyl functionality of the system, and it will be recognized by those familiar with the art than an average hydroxyl functionality of 2 must be maintained in order to produce soluble polyetheracetal resins of suitably high molecular weight. While an average hydroxyl functionality of 2 can be achieved by employing a drying oil fatty acid partial ester of polyhydroxy alcohol having approximately 2 free hydroxyl groups per molecule as the sole polyhydroxy reactant with the diallylidene acetal reactant, the invention obviously is not limited in this respect. As a matter of fact, the usual and preferred practice of this invention is to use one or more polyhydroxy alcohols together with drying oil fatty acid partial esters of polyhydroxy alcohol for preparing the air-oxidizable polyetheractal resins of this invention, and adjusting the amounts and types of the several hydroxyl-containing reactants to achieve an average hydroxyl functionality of 2 in the hydroxyl-reactant system. Any polyhydroxy alcohol is suitable for this purpose, including, for example, ethylene glycol, diethylene glycol, propylene glcol, butanediol, hexylene glycol, glycerine, pentaerythritol, sorbitol, and any others having two or more hydroxyl groups per molecule. The exact selection of polyhydroxy alcohol to be used will be influenced by the ultimate properties desired for the polyetheracetal resin. This invention also contemplates the use of mixtures in any proportion of two or more drying oil fatty acid partial esters having different hydroxyl functionality for achieving the same purpose, as for example, mixtures of partial ester having less than 2 free hydroxyls with partial ester having more than 2 free hydroxyls. It is necessary, therefore, to know the free hydroxyl content and, accordingly, the hydroxyl functionality of the drying oil fatty acid partial ester or esters employed so that the average hydroxyl functionality of the polyol charge may be adjusted to 2, thus permitting the preparation of suitably high molecular weight soluble polyetheracetal resins.

The amount of drying oil fatty acid partial ester of polyhydroxy alcohol used in preparing the polyetheracetal resins of this invention can vary over a wide range, depending on the air drying potentiality, and other properties such as flexibility, hardness, etc., desired in the final product. In general, however, the amount employed will be within the range from about 10% by weight to 100% by weight of the total hydroxyl-containing reactants employed.

The reaction between diallylidene acetal and hydroxyl-containing reactants to produce the polyetheracetal resins containing unsaturated drying oil fatty acid substituent groups is carried out in an inert atmosphere at elevated temperatures in the presence of an acid catalyst.

Any strong nonoxidizing acid will serve as catalyst for preparation of the polyetheracetal resins of this invention, e.g., sulfuric acid, hydrochloric acid, phenyl acid phosphate, alkane sulfonic acids such as methyl sulfonic acid, ethyl sulfonic acid, etc., aryl sulfonic acids such as p-toluene sulfonic acid, naphthalene sulfonic acid, etc., dialkyl sulfates such as diethyl sulfate, diisopropyl sulfate, etc., sulfonated ion exchange resins such as sulfonated cross-linked polystyrene resin in the acid form, etc. In general, the reaction rate is proportional to the catalyst concentration, and catalyst concentrations between about 0.05% and 5% by weight may be employed. It should be noted, however, that even with average hydroxyl functionality adjusted to 2, the potential for a cross-linked product still exists because of side reactions which increase the functionality of the resin products by forming hydroxyls by way of an occasional acid catalyzed alcoholysis of a cyclic acetal group. Hence, while faster reaction rates are tempting, it should be kept in mind that the preparation has the potential to gel, and moderate reaction rates make it easier to control the preparation. Hence, catalyst concentrations between about 0.1% and about 0.5% by weight are particularly useful for controlling the reaction.

The reaction between diallylidene acetal and hydroxyl-containing reactants to produce the polyetheracetal resins of this invention is carried out at temperatures between about 100° C. and about 150° C., keeping in mind that, in general, the stronger the acid catalyst employed the lower is the preparation temperature. Thus, employing a few tenths weight percent of diethyl sulfate as catalyst, reaction temperatures on the order of 100° C.–110° C. are satisfactory, whereas with a similar amount of a sulfonated cross-linked polystyrene resin catalyst, reaction temperatures on the order of 140° C.–150° C. are necessary for a similar rate of reaction.

The reaction is carried out in an inert atmosphere in order to preserve the air-drying characteristics of the resin product. For this purpose, any gas which is inert, i.e., which does not enter into reaction with any of the reactants or with the resinous product of the reaction under the acid catalyzed conditions of reaction, is suitable, such as nitrogen, helium, argon, etc.

As the preparation of the resin proceeds and the molecular weight of the polyetheracetal resin increases, there develops the potential for gelation because of acid-catalyzed alcoholysis of cyclic acetal groups to form hydroxyl groups, as noted hereinabove. Hence, it is advisable to follow the course of the reaction by frequent viscosity determinations on the reaction mixture, or by the use of instrumentation which allows a continuous monitoring of the viscosity. Such viscosity data are useful to establish a cut-off point for terminating the reaction short of the gel point. Although the optimum viscosity for terminating the reaction may vary from one resin to another depending upon the particular reactants employed, it has been found generally useful to terminate the reaction when a 50% solution of the resin in xylene at 110° C. has reached a viscosity on the order of about R on the Gardner scale. In this connection, it may be found desirable in cases where the reaction is rapid to add solvent to the reaction mixture, either continuously or at intervals during the reaction, in order to better control the rate of reaction. An alternative is to terminate the reaction when the viscosity of the undiluted reaction mixture has reached a value on the order of about 900 to about 1,000 centipoises at 110° C. Resins with these viscosities have good solubility and are stable in organic solvents.

The resin preparation is terminated by neutralization of the acid catalyst, or in the case where a solid insoluble ion exchange resin is used by simply removing it by filtration. Soluble catalysts are neutralized by adding an excess of sodium bicarbonate and stirring the mixture for about 15 minutes. In this respect, the neutralization of the catalyst is rendered more efficient by cutting the resinous product with solvent simultaneously. Resins terminated in this way have good room temperature stability.

The neutralized resin may be cut with solvent to any desired concentration, and for this purpose, any volatile organic solvent which will dissolve the resin is suitable, such as for example, petroleum hydrocarbons, aromatic and cycloaliphatic hydrocarbons, esters, ketones, ether-alcohols, etc., and mixtures of any of these.

Addition of metal driers to solutions of the neutralized resin produces coacting compositions which cure by air oxidation to cross-linked three-dimensional structures upon evaporation of the solvent. For this purpose, any of the well-known conventional metal driers may be employed in small amounts within the range from about 0.1 weight percent of metal to about 5.0 weight percent of metal, based on the weight of polyetheracetal resin, and sufficient to catalyze air oxidation of the resin. In general, the amount and kind of metal drier employed is similar to conventional practice with known products and compositions containing drying oil acids.

The invention is illustrated by the following examples in which parts and percentages are by weight unless otherwise specified.

*Example 1*

A drying oil fatty acid partial ester of polyhydroxy alcohol was prepared by charging an esterification vessel with 2 mols of unsaturated fatty acids derived from tall oil and 1 mol of mono-pentaerythritol and heating the mixture with stirring in an inert atmosphere of nitrogen at temperatures up to 260° C. until the theoretical amount of water had been distilled off. The cooled, filtered product had an acid number of 1.1 and contained 4.0% hydroxyl, indicating an average hydroxyl functionality of 1.7. This drying oil fatty acid partial ester was used in Example 2 and also in Example 4 to prepare polyetheracetal resins having unsaturated drying oil fatty acid substituent groups.

*Example 2*

A reaction vessel equipped with agitating means was charged with:

| | Parts |
|---|---|
| 3,9-divinylspirobi(meta-dioxane) | 91 |
| Monopentaerythritol | 0.5 |
| Tall oil fatty acid partial ester of pentaerythritol from Example 1 | 133 |
| Diethyl sulfate | 1.13 |

The system was flushed out with nitrogen and a slow stream of nitrogen was passed through the reaction vessel for the entire duration of the reaction. The charge was heated with stirring to 110° C. and held at this temperature for about 45 minutes during which time a clear solution formed. The reaction mixture was cooled to 60° C. and the following ingredients were added thereto:

| | Parts |
|---|---|
| Monopentaerythritol | 7.9 |
| Diethylene glycol | 18.3 |
| Diethyl sulfate | 0.13 |

The reaction mixture was then reheated to 110° C. and held at this temperature for the remainder of the reaction. It was necessary to follow the course of the reaction by making frequent viscosity checks on the reaction mixture. After 30 minutes at 110° C. the Gardner viscosity of the reaction mixture had reached >Z6 and addition of xylene was started and maintained at such a rate that 250 parts were added in 1.75 hours with rapid addition at first. At no time during dilution with xylene did the viscosity of the reaction mixture drop below I–J on the Gardner scale. Over the next 1.5 hours the viscosity increased to Q–R on the Gardner scale and the reaction was stopped by stirring for 5 minutes with 10 parts of the sodium form of an ion exchange resin and filtering at reduced pressure. The recovered filtrate, free of catalyst, was a xylene solution containing approximately 38.9% by weight of a polyetheracetal resin having unsaturated drying oil fatty acid substituent groups therein, and having a viscosity of R–S on the Gardner scale and a color of 11.

*Example 3*

A primer formulation useful for the protection of metal surfaces and for promoting top coat adhesion was prepared from the polyetheracetal resin produced in Example 2 by grinding the following mixture in a ball mill:

| | Parts |
|---|---|
| Xylene solution of polyetheracetal resin produced in Example 2 containing 38.9% by weight of said resin | 386 |
| Red iron oxide | 57 |
| Asbestine | 37 |
| Aluminum silicate | 57 |
| Barytes | 105 |
| Rutile titanium dioxide | 24 |

This mixture was ball milled for 16 hours using twice the above mixture weight of porcelain pebbles. At the end of 16 hours the grind was thinned with an additional 386 parts of the xylene solution of polyetheracetal resin produced in Example 2. The resulting primer formulation had a Hegmann fineness of grind value of 7. It was reduced with xylene to a No. 4 Ford Cup viscosity of 24 seconds, producing a formulation containing 47% by weight total solids, and 23% by weight of the polyetheracetal resin produced in Example 2. This primer was augmented with 0.02 weight percent of manganese and 0.2 weight percent of zirconium from commercial 6% manganese and zirconium driers (Nuodex driers), respectively (based on polyetheracetal resin content), and sprayed on Bonderite–100 steel panels. After a 10-minute air dry, the coating was baked for 30 minutes at 340° F. The resulting coatings were about 0.9 mil thick and had a Sward hardness of 16–18. The same primer when top coated with an automotive-type nitrocellulose lacquer performed as follows:

| | |
|---|---|
| 5% salt fog | Passed 125 hours. |
| Direct impact | Passed 40%. |
| Reverse impact | Passed 10%. |

*Example 4*

A 3-necked resin kettle equipped with agitating means was charged with:

| | Parts |
|---|---|
| 3,9-divinylspirobi(meta-dioxane) | 326 |
| Tall oil fatty acid partial ester of pentaerythritol from Example 1 | 337 |
| Monopentaerythritol | 10 |
| Propylene glycol | 76 |
| Diethyl sulfate | 0.75 |

The resin preparation was carried out in a nitrogen atmosphere. The above charge was heated with stirring to 110° C. in about 2 hours and was held at this temperature for about 2.75 hours. The viscosity of the reaction mixture was followed continuously using a Bendix Ultra Viscoson computer. At 950 centipoises, the reaction mixture was augmented with about 390 parts of mineral spirits and 20 parts of NaHCO$_3$ and the mixture was stirred for about 30 minutes. The resulting solution was filtered and the hazy filtrate was cut with xylene to give a ratio of 1:3 xylene-mineral spirits by weight. The clear solution which resulted contained 46% by weight of solids, and had a Gardner viscosity of Q–R.

A composition curable by air oxidation at room temperature was prepared with the above resin solution by adding thereto 1.70 weight percent of lead using a 24% lead Nuodex drier, 0.2 weight percent of cobalt using a 6% cobalt Nuodex drier, and 0.14 weight percent zirconium using a 6% zirconium Nuodex drier, all based on solids content of the resin solution. This solution, coated on a steel substrate, and air dried at room temperature, produced coatings about 1 mil thick (dry) which dried tack-free (touch-dry) in 24 hours.

A baking composition suitable for the protection of a wide variety of metal substrates, including can-coaters' steel, was prepared from the above resin solution by adding thereto 0.04 weight percent of cobalt using a 6% cobalt Nuodex drier, and 0.08 weight percent zirconium using a 6% zirconium Nuodex drier, based on solids content of the resin solution. Films were cast on can-coaters' steel and baked for 30 minutes at 450° F. The resulting baked coatings, about 1 mil thick, had a Sward hardness of 44 and excellent flexibility. They were not affected by 24-hour immersion in 5% hydrochloric acid, oleic acid, or boiling water.

The preceding examples are merely illustrative of the invention and its advantages. There are, obviously, many other variations in the invention, particularly with respect to the composition of the novel polyetheracetal resins produced, that will be apparent to those skilled in the art from the foregoing description. It will also be apparent to those skilled in the art that the present invention makes possible the design of air curable polyetheracetal compositions having a broad range of properties. Such compositions, either with or without inert fillers, pigments, plasticizers, flame retardants, and other conventional modifiers, are useful for the protection of glass, plastic, metal, wood, and textile substrates, by any of the conventional methods of application, such as knife coating, roller coating, brushing, spraying, or curtain coating techniques. They are also useful for potting and encapsulating purposes, and as adhesives and inks.

What I claim and desire to protect by Letters Patent is:

1. A composition comprising the reaction product of a diallylidene acetal having the general formula:

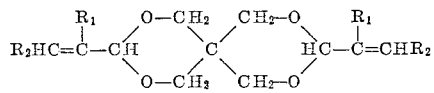

wherein $R_1$ is a substituent selected from the group consisting of hydrogen, alkyl having from 1 to 6 carbon atoms, phenyl, and halogen radicals and $R_2$ is a substituent selected from the group consisting of hydrogen and methyl radicals with aliphatic alcoholic hydroxyl-containing reactants having a stoichiometric equivalence with respect to hydroxyl groups substantially about 2, at least one of said reactants being a drying oil fatty acid partial ester of a polyhydroxy alcohol having at least one free hydroxyl group per molecule of said partial ester, said reaction product having been prepared in the presence of an acid catalyst in an inert atmosphere at elevated temperature wherein the reaction was terminated short of the gel point by removing the acid catalyst.

2. A composition in accordance with claim 1 in which the diallylidene acetal is 3,9-divinylspirobi(meta-dioxane).

3. A composition in accordance with claim 1 in which said drying oil fatty acid partial ester of a polyhydroxy alcohol has from 1 to 4 free hydroxyl groups per molecule thereof.

4. A composition in accordance with claim 1 in which said partial ester is the reaction product of unsaturated tall oil fatty acids with pentaerythritol having at least one free hydroxyl group per molecule of said reaction product.

5. A composition comprising the reaction product of:

| | Parts by weight |
|---|---|
| 3,9-divinylspirobi(meta-dioxane) | 91 |
| Tall oil fatty acid partial ester of monopentaerythritol having 4% by weight hydroxyl and an acid No. of 1.1 | 133 |
| Monopentaerythritol | 8.4 |
| Diethylene glycol | 18.3 | said reaction product having been prepared in the presence of an acid catalyst in an inert atmosphere at elevated temperature wherein the reaction was terminated short of the gel point by removing the acid catalyst.

6. A composition comprising the reaction product of

| | Parts by weight |
|---|---|
| Tall oil fatty acid partial ester of monopentaerythritol having 4% by weight hydroxyl and an thritol having 4% by weight hydroxyl and an acid No. of 1.1 | 337 |
| Monopentaerythritol | 10 |
| Propylene glycol | 76 | said reaction product having been prepared in the presence of an acid catalyst in an inert atmosphere at elevated temperature wherein the reaction was terminated short of the gel point by removing the acid catalyst.

7. A coating composition curable by air oxidation comprising (1) the reaction product of a diallylidene acetal having the general formula:

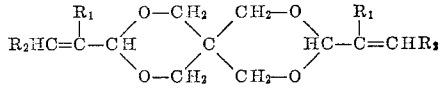

wherein $R_1$ is a substituent selected from the group consisting of hydrogen, alkyl having from 1 to 6 carbon atoms, phenyl, and halogen radicals and $R_2$ is a substituent selected from the group consisting of hydrogen and methyl radicals with aliphatic alcoholic hydroxy-containing reactants having a stoichiometric equivalence with respect to hydroxyl groups substantially about 2, at least one of said reactants being a drying oil fatty acid partial ester of a polyhydroxy alcohol having at least 1 free hydroxyl group per molecule of said ester and (2) a metal drier, said reaction product having been prepared in the presence of an acid catalyst in an inert atmosphere at elevated temperature wherein the reaction was terminated short of the gel point by removing the acid catalyst.

8. A process for producing a polyetheracetal resin product which is curable by air oxidation comprising reacting a diallylidene acetal having the general formula:

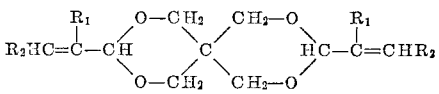

wherein $R_1$ is a substituent selected from the group consisting of hydrogen, alkyl having from 1 to 6 carbon atoms, phenyl, and halogen radicals and $R_2$ is a substituent selected from the group consisting of hydrogen and methyl radicals with aliphatic alcoholic hydroxyl-containing reactants having a stoichiometric equivalence with respect to hydroxyl groups substantially about 2, at least one of said reactants being a drying oil fatty acid partial ester of a polyhydroxy alcohol having at least one free hydroxyl group per molecule of said partial ester, in the presence of an acid catalyst in an inert atmosphere at elevated temperature, and terminating the reaction short of the gel point by removing the acid catalyst.

References Cited by the Examiner

UNITED STATES PATENTS

| | | | |
|---|---|---|---|
| 2,687,407 | 8/1954 | Orth | 260—67 |
| 2,915,492 | 12/1959 | Wilson et al. | 260—33.4 |
| 3,042,630 | 7/1962 | Ropp | 260—67 |
| 3,074,896 | 1/1963 | Duffy | 260—23 |

LEON J. BERCOVITZ, *Primary Examiner.*

R. A. WHITE, *Assistant Examiner.*